United States Patent
Breunig et al.

(10) Patent No.: US 8,455,028 B2
(45) Date of Patent: *Jun. 4, 2013

(54) METHOD FOR CONDUCTING AT LEAST ONE COOKING PROCESS

(75) Inventors: Manfred Breunig, Schongau (DE); Michael Greiner, Landsberg (DE)

(73) Assignee: Rational AG, Landsberg/Lech (DE)

( * ) Notice: Subject to any disclaimer, the term of this patent is extended or adjusted under 35 U.S.C. 154(b) by 560 days.

This patent is subject to a terminal disclaimer.

(21) Appl. No.: 12/115,892

(22) Filed: May 6, 2008

(65) Prior Publication Data

US 2008/0280000 A1 Nov. 13, 2008

(30) Foreign Application Priority Data

May 7, 2007 (EP) .................................. 07009155

(51) Int. Cl.
*A21D 8/06* (2006.01)

(52) U.S. Cl.
USPC ............. 426/233; 426/523; 700/211; 99/327; 99/332; 99/335; 99/337; 99/342; 99/344

(58) Field of Classification Search
USPC ............. 426/231, 233, 523; 700/211; 99/325, 99/327, 332, 335, 337, 342, 344
See application file for complete search history.

(56) References Cited

U.S. PATENT DOCUMENTS

| | | | |
|---|---|---|---|
| 3,783,769 A * | 1/1974 | Goodhouse et al. | 99/332 |
| 3,979,056 A * | 9/1976 | Barnes | 377/20 |
| 4,390,965 A * | 6/1983 | Albert | 700/90 |
| 4,751,092 A * | 6/1988 | Buller-Colthurst | 426/315 |
| 4,920,948 A | 5/1990 | Koether et al. | |
| 5,044,262 A * | 9/1991 | Burkett et al. | 99/327 |
| 5,148,737 A * | 9/1992 | Poulson | 99/327 |
| 5,218,527 A * | 6/1993 | Ishikawa et al. | 705/15 |
| 5,317,134 A | 5/1994 | Edamura | |

(Continued)

FOREIGN PATENT DOCUMENTS

| CA | 2195641 | 2/1996 |
|---|---|---|
| DE | 43 24 015 | 12/1994 |

(Continued)

OTHER PUBLICATIONS

Applicant Submission in EP07009155.8, dated Oct. 16, 2007 and translation.
Extended European Search Report in connection with EP07009155.8, dated Jan. 24, 2008.

(Continued)

*Primary Examiner* — Drew E Becker
(74) *Attorney, Agent, or Firm* — Marshall, Gerstein & Borun LLP; Michael P. Furmanek

(57) ABSTRACT

A method for operating at least one cooking process in a cooking chamber of a cooking appliance is based on a multiple number of parameters that can be entered through an input device of the cooking appliance. Based on the parameters, at least one cooking product and/or cooking program, at least one starting and/or ending time of the cooking of at least one cooking product and/or for at least one cooking program, and at least one cooking parameter can be selected. An output device indicates when each cooking product is to be loaded into and removed from the cooking chamber in dependence of the starting time and/or ending time, and the selection of a multiple number of cooking products. Additionally, the sequence of cooking of the cooking products can be optimized based on at least one parameter that determines at least one cooking parameter.

11 Claims, 1 Drawing Sheet

U.S. PATENT DOCUMENTS

| | | | |
|---|---|---|---|
| 5,426,580 A * | 6/1995 | Yoshida et al. | 700/14 |
| 5,520,095 A * | 5/1996 | Huber et al. | 99/332 |
| 6,083,543 A * | 7/2000 | Kim et al. | 426/231 |
| 6,330,851 B1 * | 12/2001 | Riesselmann | 99/339 |
| 6,753,027 B1 | 6/2004 | Greiner et al. | |
| 6,773,738 B2 * | 8/2004 | Berger et al. | 426/510 |
| 6,789,067 B1 * | 9/2004 | Liebenow | 705/15 |
| 6,904,969 B2 * | 6/2005 | Mueller et al. | 165/254 |
| 6,976,004 B2 * | 12/2005 | Wittrup | 705/15 |
| 7,126,088 B2 * | 10/2006 | Horton et al. | 219/412 |
| 7,141,258 B2 * | 11/2006 | Hillmann | 426/233 |
| 8,147,888 B2 * | 4/2012 | Kling et al. | 426/233 |
| 2001/0051202 A1 | 12/2001 | Hofer | |
| 2003/0139843 A1 * | 7/2003 | Hu et al. | 700/211 |
| 2006/0185810 A1 | 8/2006 | Juergens et al. | |
| 2008/0319864 A1 * | 12/2008 | Leet | 705/15 |
| 2009/0274802 A1 * | 11/2009 | Kling et al. | 426/231 |
| 2010/0186600 A1 * | 7/2010 | Lewis et al. | 99/327 |

FOREIGN PATENT DOCUMENTS

| | | |
|---|---|---|
| DE | 196 09 116 A1 | 9/1997 |
| DE | 199 45 021 | 4/2001 |
| DE | 202 03 117 | 2/2002 |
| DE | 101 32 581 | 1/2003 |
| DE | 10 2005 020 744 | 12/2006 |
| DE | 10 2006 008 096 | 8/2007 |
| EP | 0 313 768 | 5/1989 |
| EP | 1 338 849 | 8/2003 |
| GB | 2 380 923 | 4/2003 |
| WO | WO-96/03681 | 2/1996 |
| WO | WO-98/52418 | 11/1998 |
| WO | WO-2005/016096 | 2/2005 |

OTHER PUBLICATIONS

Partial European Search Report in connection with EP07009155.8, dated Sep. 18, 2007.

Office Action for U.S. Appl. No. 13/238,481 dated Feb. 1, 2013.

* cited by examiner

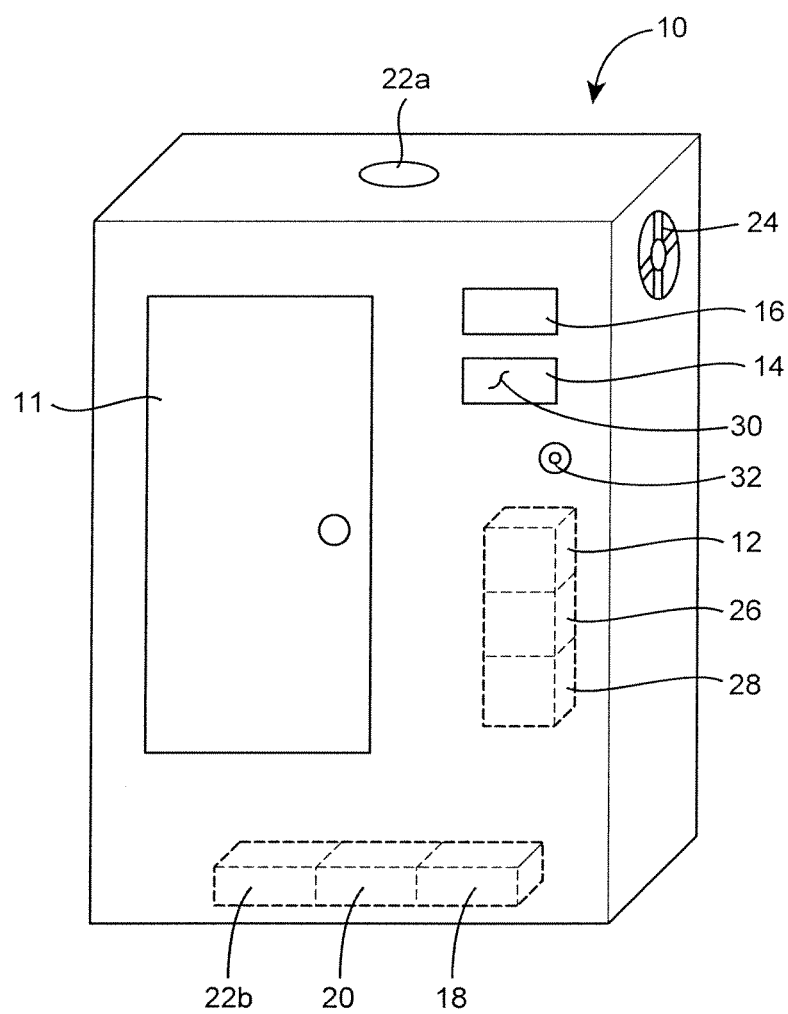

METHOD FOR CONDUCTING AT LEAST ONE COOKING PROCESS

CROSS-REFERENCE TO RELATED APPLICATIONS

The priority benefit of European Patent Application No. EP 07009155.8, filed May 7, 2007, is claimed, and the entire contents thereof are incorporated herein by reference.

FIELD OF THE DISCLOSURE

The present invention concerns a method for conducting at least one cooking process in a cooking chamber of a cooking appliance based on a multiple number of parameters that can be entered through an input device of the cooking appliance, whereby, using the parameters, at least one cooking product and/or cooking program and at least one starting and/or ending time of the cooking of at least one cooking product and/or for at least one cooking program and at least one cooking parameter can be selected, and a cooking appliance for this purpose.

BACKGROUND

Numerous methods are known in the state of the art for the conduction of at least one cooking process.

Thus, for example, it is known from DE 199 45 021 A1 that a cooking process can be conducted as a function of a given cooking product size as cooking parameter, whereby the core temperature of a cooking product, the diameter of the cooking product, the density of the cooking product, the type of cooking product, the degree of ripeness of the cooking product, the pH value of the cooking product, the consistency of the cooking product, the storage state of the cooking product, the odor of the cooking product, the flavor of the cooking product, the quality of the cooking product, the browning of the cooking product, the crust formation of the cooking product, the vitamin degradation of the cooking product, the formation of carcinogenic substances in the cooking product, the hygiene of the cooking product, and/or the thermal conductivity of the cooking product can be determined as cooking product parameters.

From EP 1 338 849 A1, the conduction of a cooking process as a function of at least two parameters is known, that can be selected by an operator through a characteristic diagram that is at least two-dimensional. The parameters can be, for example, a degree of browning, that is, the external degree of doneness of a cooking product, or a core temperature, that is, the internal doneness of the cooking product.

DE 196 09 116 A1 discloses a cooking method in a cooking chamber, which is ended when an actual core temperature reaches a target core temperature in a cooking product. If, in addition, the end time point of the cooking method is set, the cooking chamber temperature, the circulating flow velocity in the cooking chamber and the moisture content in the cooking chamber are set or changed in such a way that the target core temperature is reached at the predetermined ending time.

Furthermore, numerous methods are known from the state of the art, which concern the cooking of a multiple number of cooking products in the cooking appliance, especially in different loading levels of a cooking chamber.

Thus, a cooking appliance with a multiple number of loading levels is known from WO 2005/016096 A1, whereby a clock that can be initiated manually is assigned to each loading level, with which a cooking time can be set in this loading level, which makes it possible to display a remaining cooking time for this loading level on a display unit, and, after the elapse of the cooking time, to output a message for unloading the cooking product from this loading level.

DE 101 32 581 A1 also concerns a cooking appliance with a multiple number of treatment levels, in which different cooking products can be cooked. Hereby it is possible to obtain a common end time of these cooking products in case the cooking of these was begun simultaneously, even when the cooking products require different cooking times. For this purpose, the cooking chamber atmosphere can be set separately in the different loading levels, in order that the different cooking methods can be conducted parallel in a cooking chamber in an energy saving manner.

Furthermore, it is known from EP 0 313 768 B2 that a parameter-controlled system can be used in a cooking appliance, that makes it possible to preset at least one heating parameter through an input device when a certain cooking product is selected, and when the input device is actuated again, to display a position in the cooking chamber for the selected cooking product.

Moreover, DE 10 2005 020 744 B3 discloses the compensation for the opening of a cooking chamber door during the conduction of a cooking process. However, in spite of the numerous cooking methods and cooking appliances known in the state of the art, there is still need for further flexibility in connection with the simultaneous automation of a cooking method.

BRIEF DESCRIPTION OF THE DRAWING

FIG. 1 is a perspective view of a cooking appliance constructed in accordance with the principles of the present disclosure.

GENERAL DESCRIPTION OF THE INVENTION

Therefore, one task of the invention is to further develop the generic process in such a way that, with increased flexibility, enhanced cooking reliability is achieved in comparison to known methods by further automation, so that a desired cooking result is achieved at the end of a cooking process.

According to the invention, this task can be accomplished by the fact that, in dependence of the selection of the starting and/or ending time, in the selection of a multiple number of cooking products and/or cooking programs, an output device indicates when and which cooking product is to be loaded into the cooking chamber and is to be removed from the cooking chamber and/or through at least one parameter that determines at least one cooking parameter, each cooking process is optimized with respect to the energy consumed by the cooking appliance, the required time and/or the weight loss of each cooking product and/or, in the case of a multiple number of cooking products and/or cooking programs, the sequence of the cooking of the cooking products and/or of the cooking programs.

Thus, a high degree of flexibility is provided while simultaneously retaining the exact conduction of a cooking procedure to attain a desired cooking result. Namely, in a first alternative according to the invention, the possibility of conducting several cooking programs automatically in succession is provided, even interlaced with one another, without predetermining a sequence and also several times. For example, by selecting a starting time, the entire morning program in a bakery can be preset once, so that the personnel of the bakery is informed accurately each morning as to when and which cooking product is to be loaded and subsequently unloaded. In addition, mixed loads of finishing runs, for example, for preparation of a banquet can be preprogrammed, whereby foods with longer cooking durations receive a loading request first. In a second alternative, the flexibility during cooking is increased by the fact that an operator can enter that a cooking process is to be optimized with regard to energy consumption, required time, and/or weight loss of the cooking product. Thus, specifically, a combination of these two alternatives leads to the fact that an operator can select a multiple number of cooking programs while simultaneously requiring the cooking to be performed in an energy-saving manner. Then, the method according to the invention evaluates this information so that an energy-optimized program linkage is proposed, by displaying when and which cooking product is to be loaded and unloaded.

Hereby, according to the invention, preferably, the output device displays a loading request, preferably indicating the cooking product and/or a cooking chamber zone such as a loading level, an error message and/or a cooking information in dependence of the entered parameters, a multiple number of stored data, especially including cooking courses, at least one first measured value determined in the cooking chamber, at least one second measured value determined in at least one cooking product, at least one third measured value of a cooking medium, and/or at least one fourth measured value for an opening of a door for closing a cooking chamber. It may also be proposed by the cooking appliance whether, and if so, which cooking product can be cooked additionally, together with an already running cooking process, which leads to an additional saving of energy or time. Also a testing of the plausibility of the inputs of the operator can occur automatically.

Furthermore, according to the invention it can be provided that at least one value characteristic for the internal degree of doneness and/or external degree of doneness that is desired at the end of a cooking program, and/or for the C value of each cooking product can be entered as parameter. This can lead to an increase of cooking quality.

It is also proposed with the invention that, during a cooking procedure, a multiple number of cooking programs run, which can also be different at least in part, and/or at least two cooking programs run overlapped at least part of the time, whereby the cooking process is preferably storable and/or during the cooking process preferably a compensation of the effects of opening of a cooking chamber door can be performed.

As a result of this, not only avoidance of dead times as well as saving of resources is achieved, but also tedious multiple entry of many cooking programs can be avoided, namely by storing all inputs, while the desired cooking results are ensured by compensation for each opening of a cooking chamber door.

Furthermore, according to the invention, it may be provided that at least one parameter determining at least one cooking parameter is selected through a multidimensional field, which can preferably be displayed on the display device. Thus the operation is simplified.

The invention also proposes a cooking appliance 10 (FIG. 1) with a door 11 and a control and regulating device 12 in working connection with an input device 14 and an output device 16 for performing a method according the invention by activating a heating device 18 comprising at least one electrical heater, a gas burner, a heat exchanger, and/or a device for introducing electromagnetic radiation into the cooking chamber, especially in the form of a microwave source; a device for introducing moisture 20 into the cooking chamber comprising at least one steam generator, a water atomizer, and/or a steaming device; a device for removing moisture 22a, 22b from the cooking chamber comprising at least one fresh air inlet 22a and/or a condenser 22b; and a device for circulating the cooking chamber atmosphere 24 comprising at least one fan and/or one pump.

Hereby, embodiments can be characterized by a memory device 26 in which a multiple number of cooking courses are stored, whereby, preferably, after completion of each cooking process each performed cooking courses can be stored in the memory device 26.

Furthermore, according to the invention, at least one sensor unit 28 is provided, with which the first, second, third, and/or fourth measured value can be determined.

Finally, it can also be provided according to the invention that the input device 14 makes it possible to select at least two parameters over a two-dimensional field, for example, using a touch-screen 30 or a joystick 32.

Further characteristics and advantages of the invention follow from the description of specific practical examples given below.

DESCRIPTION OF PREFERRED EMBODIMENTS

For example, a method according to the invention makes it possible to optimize the morning loading of counters for a bakery store with regard to time and energy. Thus, cooking programs used each day, intended to process bakery products to be freshly baked each day from frozen parts of dough or from prebaked products, can be entered once through an input device in a cooking appliance and stored, so that after starting the cooking appliance each morning, it first heats its cooking chamber and then goes through the predetermined programs, so to speak in a stack, and, to be precise, with special consideration of optimization of time and energy. For example, if baguettes, bread rolls, pretzels and croissants are to be baked each morning, then the following requirements may appear on a display device of the cooking appliance after its staring and a heating time:

load baguettes;
unload baguettes;
load bread rolls;
unload bread rolls;
load pretzels;
unload pretzels;
load croissants; and
unload croissants, whereby preheating may occur between each of the various requests for loading. The counters of the bakery store are filled after running through this stack of programs.

Another processing of a program stack may be useful, for example, in the preparation of a lunch menu for catering in schools. In this case, meals, for example, in the form of a slice of meat, a potato side dish, and a vegetable side dish are regenerated or finish cooked in food containers for many students so that the serving of foods can take place at a given time. After turning on the cooking appliance and input of the foods, in a method according to the invention, an optimum linkage of the cooking methods to be performed is calculated, and then, after heating the cooking chamber, the request is issued to load the meat first. After a first time span, the request to load the potato side dish follows. After a second time span, the request to load the vegetable side dish is given. After a third time span, finally the request comes to unload the meat as well as the potato side dish and the vegetable side dish.

For example, parallel to a steaming of vegetable in a cooking chamber, cooking of eggs can also be performed, since both require a similar cooking chamber atmosphere. More precisely, it can be said that when introducing the potato preparation into a steaming process and cooking eggs in a method according to the invention, after a preheating step, it will appear on a display device, that the potatoes and the eggs should be loaded simultaneously, and then an unloading display for the eggs will follow before the unloading display for the potatoes appears. Hereby, the times of opening the door are taken into account automatically, as described, for example, in DE 10 2005 020 744 B3 of the Applicant.

The interlacing and/or stacking of programs according to the invention also makes it possible to use a cooking chamber atmosphere in an energy and time-saving manner for the purpose of preparing different aliments.

It should also be pointed out that a method according to the invention calculates an optimal time sequence of processes running one after another and/or running partly parallel, and it displays the corresponding result to the operator via loading and unloading requests. In order to introduce additional variability here, according to the invention performing the cooking with different priorities is also provided. In other words, not only optimization of the cooking quality should occur, but it should also be possible for a client to choose a variation that is optimized for energy, time or weight. Of course, all these parameters mutually influence one another, so that the method according to the invention selects a compromise, so that, in other words, the selection by an operator establishes a focal point for the optimization of a cooking method. Thus, for example, a display device of a cooking appliance according to the invention can display a two-dimensional field for the selection of cooking parameters, for example, with time plotted on the x-axis and energy on the y-axis, and an operator can choose a point in this field. If the display device is in the form a touchscreen, a point can simply be activated by finger pressure, but selection with a joystick is also conceivable.

Optimization of time and energy is achieved with cooking appliances which, in addition to a conventional heating device, either in the form of an electric heating device or including a gas burner, have at least one microwave source, since microwaves make possible greater flexibility, because they lead to a rapid increase of the core temperature inside a cooking product, without this resulting in the arrival at a determined end state at an early point in time. Therefore, when directing a microwave source, it is recommended that the so-called cooking value (C value) be utilized in conducting the cooking process, which can be calculated as follows:

$$C_{BT}^{UF} = \int_{St}^{t'} UF^{\frac{[T(t)-BT]}{10}} dt,$$

where UF=conversion factor;
BT=reference temperature=100° C.;
T(t)=core temperature curve;
St=time at which a starting temperature was exceeded, depending on the food; and
t'=actual time.

For example, let us assume that an operator of a cooking appliance according to the invention has to serve food for a festivity at a given time and the preparation should proceed in an energy-saving manner. Thus, in preparation for the festivity, the operator could enter that on the day of the festivity, a roast should be cooked to be ready at a given time, and with as little energy consumption as possible. Then the method according to the invention would calculate the time at which the loading display should appear, in order to remind the operator to load the cooking appliance.

Should the time desired by the operator for having the roast ready be shorter that the actually required cooking time, then a corresponding message will appear on the display device of the cooking appliance, namely, in the form of an error message. Therefore a plausibility testing occurs automatically according to the invention.

During a cooking process, the actual cooking appliance settings, for example, regarding the microwave power, moisture and similar, can be displayed on the display device. According to the invention it is also possible for an operator to receive information via the display device as to which cooking product could be cooked optimally parallel to a cooking process that is already running. Thus, for example, when cooking a roast, which takes a long time, vegetable side dishes can be added at a given time. Thus, an optimum interlacing of programs and parallel processing of cooking products is proposed.

Furthermore, it is pointed out that the calculations in the method according to the invention can be carried out based on previously recorded measured curves assuming full loading of a cooking appliance, so that, in case of partial loading, an adjustment of the process must take place automatically, namely as a function of measured values obtained with at least one measuring device. Such adjustments are known in the state of the art, see for example DE 196 09 116 A1.

The advantage of linking or stacking of programs also consist, specifically, in the fact that an operator needs to enter a sequence of cooking programs only once and can leave it in the cooking appliance.

The characteristics disclosed in the above description and in the claims can be essential both individually and also in any arbitrary combination for the realization of the invention in its various embodiments.

What is claimed is:

1. A method for operating a cooking process based on a multiple number of entered parameters, the method comprising:

entering parameters through an input device of the cooking appliance, the entered parameters including (i) at least one of a multiple number of cooking products and a multiple number of cooking programs, (ii) an ending time, and (iii) at least one cooking parameter per cooking product or cooking program;

indicating, with an output device, when each cooking product of a multiple number of selected cooking products is to be loaded into a cooking chamber of a cooking appliance and to be removed from the cooking chamber depending on the ending time for each cooking product for conducting the multiple number of cooking programs automatically in a sequence; and running at least two cooking programs in the cooking chamber during a cooking process, each cooking program comprising a plurality of atmosphere settings for the cooking chamber, at least one atmosphere setting of each cooking program being different than the corresponding atmosphere setting of the other cooking program(s), wherein the atmosphere settings include a temperature setting, a moisture setting, and an air flow circulation setting, and wherein running the at least two cooking programs comprises running the at least two cooking programs overlapped at least part of the time by automatically calculating an optimum sequence of atmosphere settings based on the atmosphere settings of the at least two cooking programs, the optimized sequence of atmosphere settings being used for changing the atmosphere in the cooking chamber to optimize the cooking process with regard to at least one of the energy consumed by the cooking appliance, the required time, and the weight loss of each cooking product to minimize dead time and save resources.

2. The method according to claim 1, further comprising displaying, with the output device, at least one of:
- a loading request in dependence of at least one of the entered parameters,
- an error message in dependence of at least one of the entered parameters,
- cooking information in dependence of at least one of the entered parameters,
- a multiple number of stored data,
- at least one first measured value obtained in the cooking chamber,
- at least one second measured value obtained in at least one cooking product,
- at least one third measured value of a cooking medium, and
- at least one fourth measured value for an opening of a door for closing the cooking chamber.

3. The method according to claim 2, wherein displaying the loading request comprises indicating at least one of a cooking product and a cooking chamber zone.

4. The method according to claim 3, wherein indicating a cooking chamber zone comprises indicating a loading level.

5. The method according to claim 1, further comprising entering at least one cooking parameter.

6. The method according to claim 5, wherein entering at least one cooking parameter comprises entering at least one of a value characteristic of the internal degree of cooking for each product that is desired at the end of a cooking program, a value characteristic of the external degree of cooking for each cooking product that is desired at the end of a cooking program, and a C value of each cooking product.

7. The method of claim 1, further comprising at least one of:
- storing the cooking process; and
- compensating for the effects of opening the cooking chamber door during the cooking procedure.

8. The method according to claim 1, further comprising selecting the at least one cooking parameter from a multidimensional field.

9. The method according to claim 8, further comprising displaying the at least one cooking parameter on a display device.

10. The method according to claim 1, wherein indicating when each cooking product of the multiple number of selected cooking products is to be loaded into the cooking chamber depends on a common ending time for all of the multiple number of selected cooking products.

11. The method according to claim 1, further comprising automatically varying an atmosphere in the cooking chamber based on at least one of the entered parameters through at least one of a heating device, a device for introducing moisture, a device for removing moisture, and a device for circulating a working chamber atmosphere.

* * * * *